(12) United States Patent
Thorup

(10) Patent No.: US 7,861,004 B2
(45) Date of Patent: Dec. 28, 2010

(54) SYSTEM AND METHOD FOR ANALYZING DATA TRAFFIC

(75) Inventor: Mikkel Thorup, Florence, MA (US)

(73) Assignee: AT&T Intellectual Property I, LP, Reno, NV (US)

( * ) Notice: Subject to any disclaimer, the term of this patent is extended or adjusted under 35 U.S.C. 154(b) by 224 days.

(21) Appl. No.: 12/328,638

(22) Filed: Dec. 4, 2008

(65) Prior Publication Data

US 2010/0146143 A1     Jun. 10, 2010

(51) Int. Cl.
    *G06F 15/16*     (2006.01)
(52) U.S. Cl. ................. 709/247; 709/217; 709/235
(58) Field of Classification Search ............... 709/247, 709/235, 217
See application file for complete search history.

(56) References Cited

U.S. PATENT DOCUMENTS

| 6,625,612 | B1* | 9/2003 | Tal et al. ............... 707/999.102 |
| 2007/0198523 | A1* | 8/2007 | Hayim ..................... 707/10 |
| 2009/0049271 | A1* | 2/2009 | Schneider ................ 711/206 |
| 2009/0222408 | A1* | 9/2009 | Charles et al. ............. 707/3 |
| 2009/0248874 | A1* | 10/2009 | Karger et al. ............ 709/226 |
| 2009/0293125 | A1* | 11/2009 | Szor ....................... 726/24 |

\* cited by examiner

*Primary Examiner*—Kenny S Lin
(74) *Attorney, Agent, or Firm*—Larson Newman & Abel, LLP

(57) ABSTRACT

A method of analyzing data traffic includes receiving a request at a data analysis system to store a string related to header information associated with a data packet. The method also includes applying a hash function to the string, thereby obtaining a 32-bit intermediate, and applying another hash function to the 32-bit intermediate, thereby obtaining a hash number. Further, the method includes storing the string in an array position corresponding to the hash number, when the array position is empty.

16 Claims, 5 Drawing Sheets

SYSTEM AND METHOD FOR ANALYZING DATA TRAFFIC

FIELD OF THE DISCLOSURE

The present disclosure generally relates to communications networks, and more particularly relates to analyzing data traffic.

BACKGROUND

Managing data traffic can involve storing large numbers of data files or monitoring large numbers of data packets. Cataloguing files and monitoring data traffic packets can be a cumbersome task. Moreover, inserting, finding or deleting catalogued elements can be slow and unreliable.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

In one embodiment, a method of managing data includes receiving a request at a data analysis system to store a string related to header information associated with a data packet. The method also includes applying a simple hash function to the string, thereby obtaining a 32-bit intermediate, and applying a complicated hash function to the 32-bit intermediate, thereby obtaining a hash number. The method includes storing the string in an array position corresponding to the hash number, when the array position is empty.

In another embodiment, a method of managing data includes receiving a request at a data analysis system to find or store a string related to a data file. The method also includes applying a simple hash function to the string, thereby obtaining a 32-bit intermediate and applying a complicated hash function to the 32-bit intermediate, thereby obtaining a hash number. Further, the method includes storing the string in a hash table at a position corresponding to the hash number, when the position is empty.

In a further embodiment, a computer-readable medium including processor-readable instructions that are executable by a processor to perform a method, the method comprising applying a simple hash function to a string, thereby obtaining a 64-bit intermediate, in response to a command to find or store the string in a hash table that is adapted to store more than 4,000,000 strings; applying a complicated hash function to the 64-bit intermediate, thereby obtaining a hash number; and storing the string in an array position corresponding to the hash number, when the array position is empty.

In an additional embodiment, a computer-readable medium including processor-readable instructions that are executable by a processor to perform a method, the method comprising receiving a command to delete a string from a hash table; applying a simple hash function to the string, thereby obtaining a 32-bit intermediate; applying a complicated hash function to the 32-bit intermediate, thereby obtaining a hash number; and deleting the string from a hash table position corresponding to the hash number when the string is stored at the hash table position.

Figure 1:
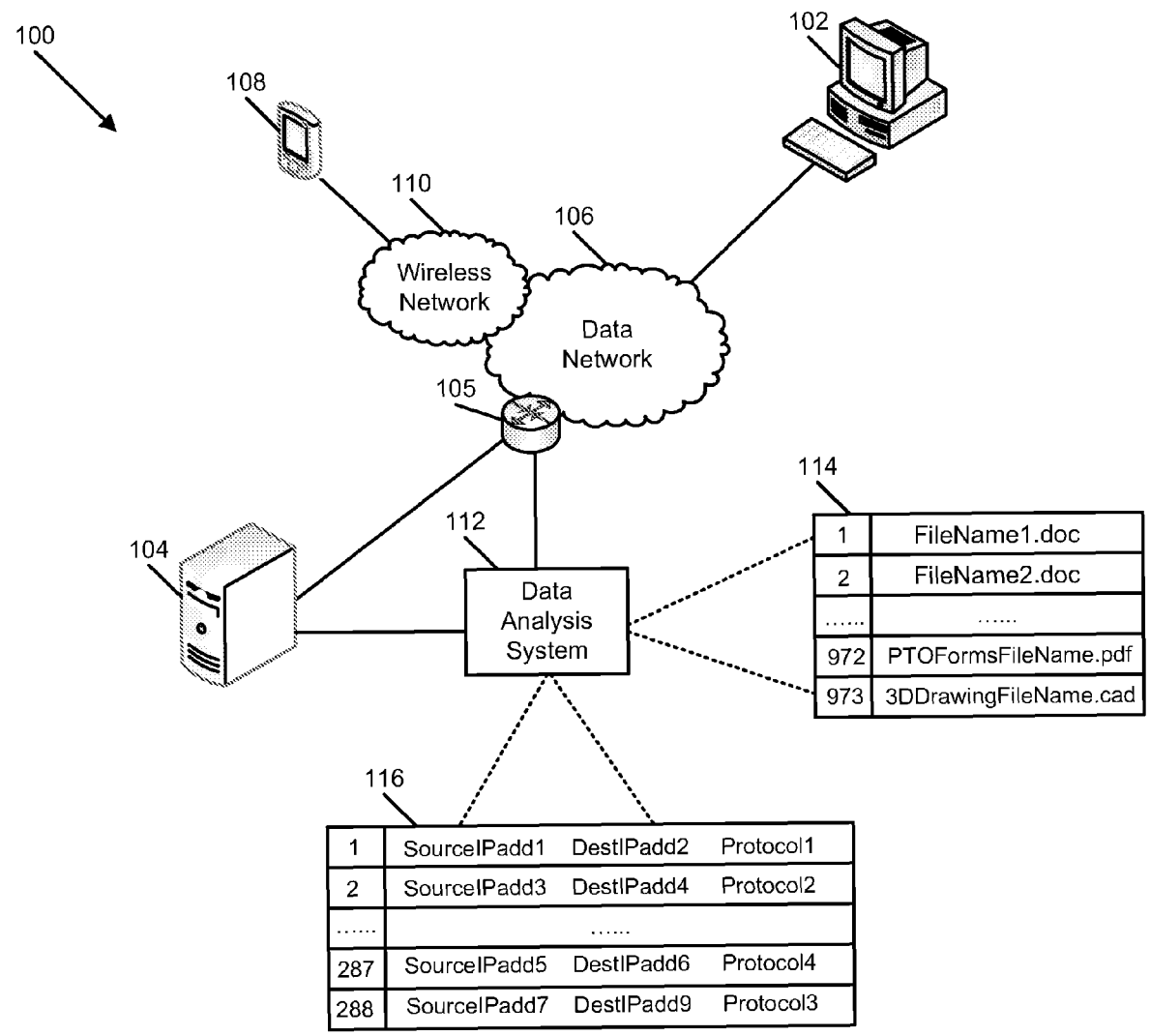
FIG. 1 is a block diagram illustrating a particular embodiment of a system to analyze data traffic.

FIG. 1 illustrates a particular embodiment of a system to analyze data traffic. The system includes a user computing device 102 communicating with a server 104 via a data network 106. For example, the user computing device 102 can exchange data with the server 104 during an Internet session. The system 100 also includes a user wireless device 108 (e.g., cell phone, handheld computing device, music player or any combination thereof) communicating with the server 104 via the data network 106 and via a wireless network 1 10. In one example, the user wireless device 108 can exchange data with the server 104 during an Internet session or a wireless call. Further, the system 100 includes a data analysis system 112 that communicates with the server 104 directly or via the network 106. Alternatively, the data analysis system 112 can be integrated with the server 104. The data analysis system 112 stores variable length strings corresponding to stored files, data packets, other data traffic, or any combination thereof, via arrays such as hash tables 114 and 116.

In an illustrative embodiment, the data analysis system 112 is adapted to receive from the server 104 a string related to a data file, such as a keyword (such as text included in a word processing file or other file), a portion of a file name, a date, a time, an author, a file type, a storage location, another string, or any combination thereof. The data analysis system 112 can also be adapted to receive a request to store or find the string in an array of strings, such as a hash table, which identifies files stored at a storage location, such as a database, the server 104, another server, another file storage system, or any combination thereof For example, the data analysis system 112 can be adapted to receive a request to find the string and, if the string is not found, to store the string in an empty position in the array.

The data analysis system 112 is adapted to apply a simple hash function, such as a universal hash function or a 2-universal hash function, to the string, thereby obtaining a 32-bit intermediate, such as a 32-bit integer. Further, the data analysis system 112 is adapted to apply a complicated hash function, such as a 5-universal hash function, to the intermediate to obtain a hash number. For instance, a tabulated 5-universal hash function can be used. Alternatively, a degree 4 polynomial can be used for 5-universal hashing. Note that a k-universal hash function is a function mapping any k strings independently and uniformly with statistical randomness.

The data analysis system 112 is adapted to check a position corresponding to the hash number in the hash table 114. For instance, the data analysis system 112 can be adapted to determine whether the hash table position is empty—that is, no string is stored at the hash table position. The data analysis system 112 can be adapted to store the string at the hash table position when it is empty. Conversely, the data analysis system 112 can be adapted to determine whether a match to the string is stored at the hash table position, when the hash table position is not empty. If a match is stored at the hash table position, the data analysis system 112 can be adapted to output data to the server 104 indicating that a match to the string has been found. For instance, the data analysis system 112 can be adapted to output data indicating that a file that includes the portion of the file name is already stored at a database or other system whose contents are catalogued using the hash table 114. In one embodiment, the data analysis system 112 can be adapted to return data stored with the file, or to cause the database or other system to return such data, such as the contents of the file, file property information, other data, or any combination thereof.

When the hash table position corresponding to the hash number is not empty and does not include a match to the string, the data analysis system 112 is adapted to check a next array position, such as an array position corresponding to a next highest number or a next lowest number relative the hash number and to store the string at the next hash table position, if the next hash table position is empty, and to output data indicating that the string is already stored in the hash table, if a match to the string is stored at the next hash table position. The data analysis system 112 can be adapted to iteratively check next hash table positions in the hash table 114 until an empty position or a match to the string is found.

In another illustrative embodiment, the server 104 can communicate with the network 106 via a router 105. The data analysis system 112 can be adapted to receive from the router 105 a string related to header information associated with a particular data packet. For example, a data packet can be transmitted to or from the user computing device during an Internet session, in conjunction with an e-mail communication, or in conjunction with another data transmission. In another example, a data packet can be transmitted to or from the user wireless phone 108 in conjunction with a call, a text message, an Internet session, an e-mail communication, or another data transmission. Strings related to header information can include, for example, a source address (such as an IP address), a destination address, a protocol type, a sender identifier, a recipient identifier, a subject, a sending time stamp, a receiving time stamp, a mail transfer agent identifier, a syncword, other header information, or any combination thereof.

The data analysis system 112 is adapted to apply a simple hash function, such as a universal hash function or a 2-universal hash function, to the string, thereby obtaining a 32-bit intermediate, and to apply a complicated hash function to the intermediate to obtain a hash number. The data analysis system 112 is adapted to check a position corresponding to the hash number in another array, such as another hash 116 table that stores strings related to data packets received at the router 105, the server 104, another data packet transmission system, or any combination thereof. The data analysis system 112 can be adapted to store the string at the position corresponding to the hash number, of the position is empty, or to report that a match to the string has been found, if a match is stored at the position corresponding to the hash number. For instance, the data analysis system 112 can output data indicating that the particular data packet is associated with a particular transmission, such as an Internet session between the user computing device 102 and the server 104. The data analysis system 112 can be adapted to iteratively check next hash table positions in the other hash table 116 until an empty position or a match to the string is found.

In a further illustrative embodiment, the data analysis system 112 can be adapted to receive a command from the server 104, the router 105 or another source, to delete an identified string from an array, such as the hash table 116. The data analysis system 112 can be adapted to apply a simple hash function, such as a universal hash function or a 2-universal hash function, to the string, thereby obtaining a 32-bit intermediate, and to apply a complicated hash function, such as a 5-universal hash function, to the intermediate to obtain a hash number.

The data analysis system 112 is adapted to check a position in the hash table 116 corresponding to the hash number and to delete the identified string from the hash table 116, when the identified string is stored at the position. If the identified string is not stored at the identified position, the data analysis system 112 can be adapted to check a next hash table position and to delete the identified string from the hash table 116 when the identified string is stored at the next hash table position. The data analysis system 112 can be adapted to iteratively check next hash table positions until the identified string is deleted or an empty position is reached. The data analysis system 112 can be adapted to indicate that the string is not stored at the hash table 116 when an empty position is reached.

In one embodiment, after an identified string is deleted from the hash table 116, the data analysis system 112 can be adapted to check a next hash table position relative to the hash table position from which the identified string was deleted. The data analysis system 112 can be adapted to determine whether the next hash table position is filled and, if so, whether another string stored at the next hash table position hashes to a number that is less than or equal to the hash number corresponding to the hash table position from which the identified string was deleted. If the other string hashes to a number that is less than or equal to the hash number corresponding to the hash table position from which the identified string was deleted, the data analysis system 112 can be adapted to delete the other string from its initial hash table position and to store the other string at the hash table position from which the identified string was deleted.

For example, as explained previously, the other string may hash to a number that corresponds to a particular position in the hash table 116, but the identified string may have already been stored at the particular position. Thus, the other string would have been stored at the next hash table position. When the identified string is deleted, the other string may be deleted from the next hash table position and stored at the position from which the identified string was deleted. Hence, the other string is "moved up" to close a gap in the hash table 116.

Figure 2:
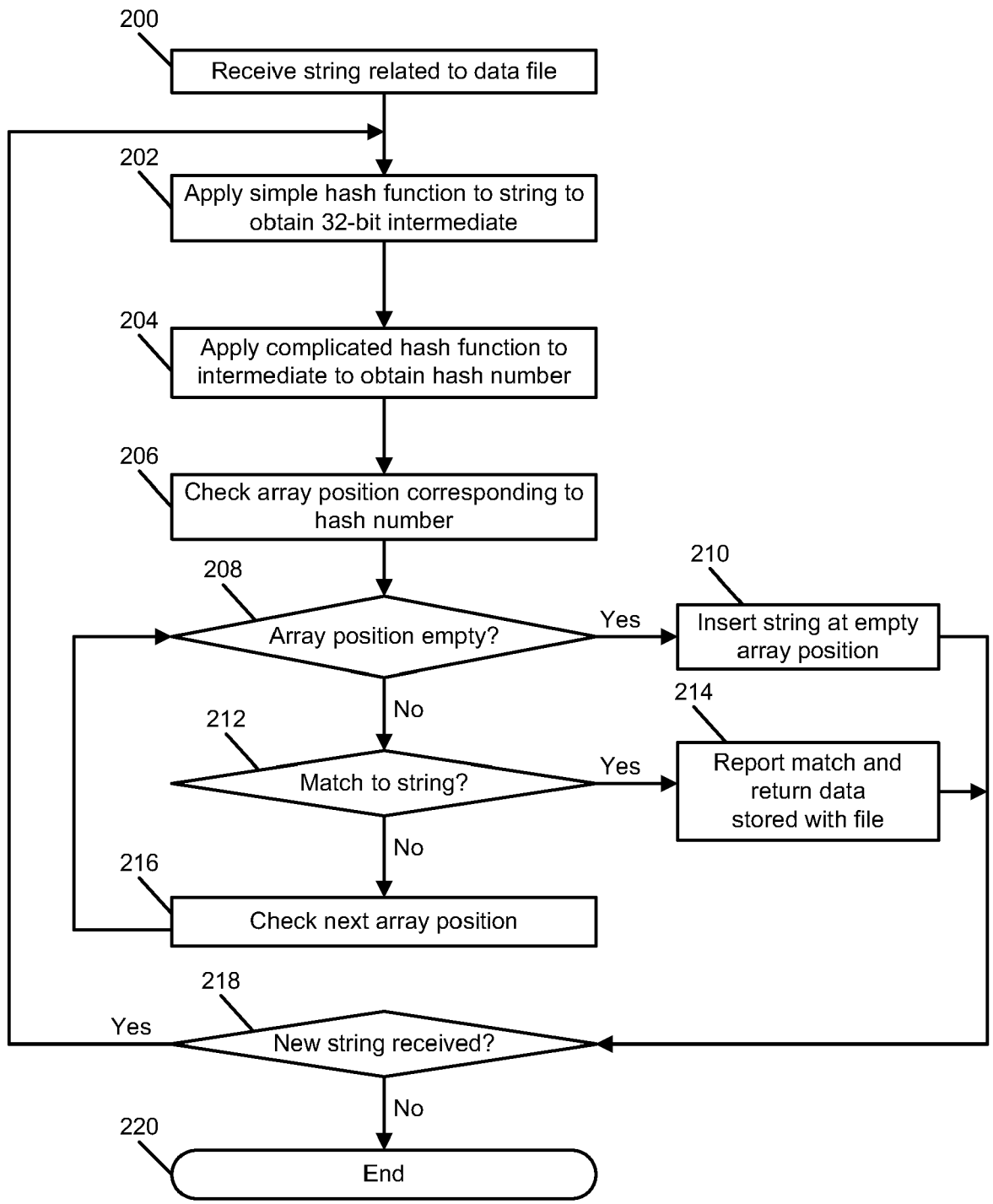
FIG. 2 is a flow diagram illustrating a particular embodiment of a method of analyzing data traffic.

FIG. 2 illustrates a particular embodiment of a method of analyzing data traffic. At block 200, a data analysis system receives a string related to a data file, such as a portion of a file name. Moving to block 202, the data analysis system applies a simple hash function, such as a universal hash function or a 2-universal hash function, to the string, thereby obtaining a 32-bit intermediate. Proceeding to block 204, the data analysis system applies a complicated hash function, such as a 5-universal hash function, to the intermediate to obtain a hash number. Continuing to block 206, the data analysis system checks a position corresponding to the hash number in an array, such as a hash table, a database table or other array that stores strings related to files stored at a file storage system.

Advancing to decision node 208, the data analysis system determines whether the array position is empty—that is, no string is stored at the array position. If the array position is empty, the method moves to block 210, and the string is stored at the array position. Conversely, if the array position is not empty, the data analysis system determines whether a match to the string is stored at the array position. If a match is stored at the array position, the method moves to block 214, and the data analysis can report that a match has been found. For instance, the data analysis system can output data indicating that a file that includes the portion of the file name is already stored at a database or other system whose contents are catalogued using the array. Additionally, the data analysis system can return data stored with the file or can cause the database or other system to return such data, such as the contents of the file, file property information, other data, or any combination thereof.

Returning to decision node 212, if the array position is not empty and does not include a match to the string, the method proceeds to block 216, and the data analysis system checks a next array position, such as an array position corresponding to a next highest number or a next lowest number relative the hash number. The method then returns to decision node 208. Next array positions can be checked until an empty position or a match to the string is found. The method can then proceed to decision node 218, and the data analysis system determines whether a new string has been received. If a new string has been received, the method returns to block 202. The method terminates at 220.

Figure 3:
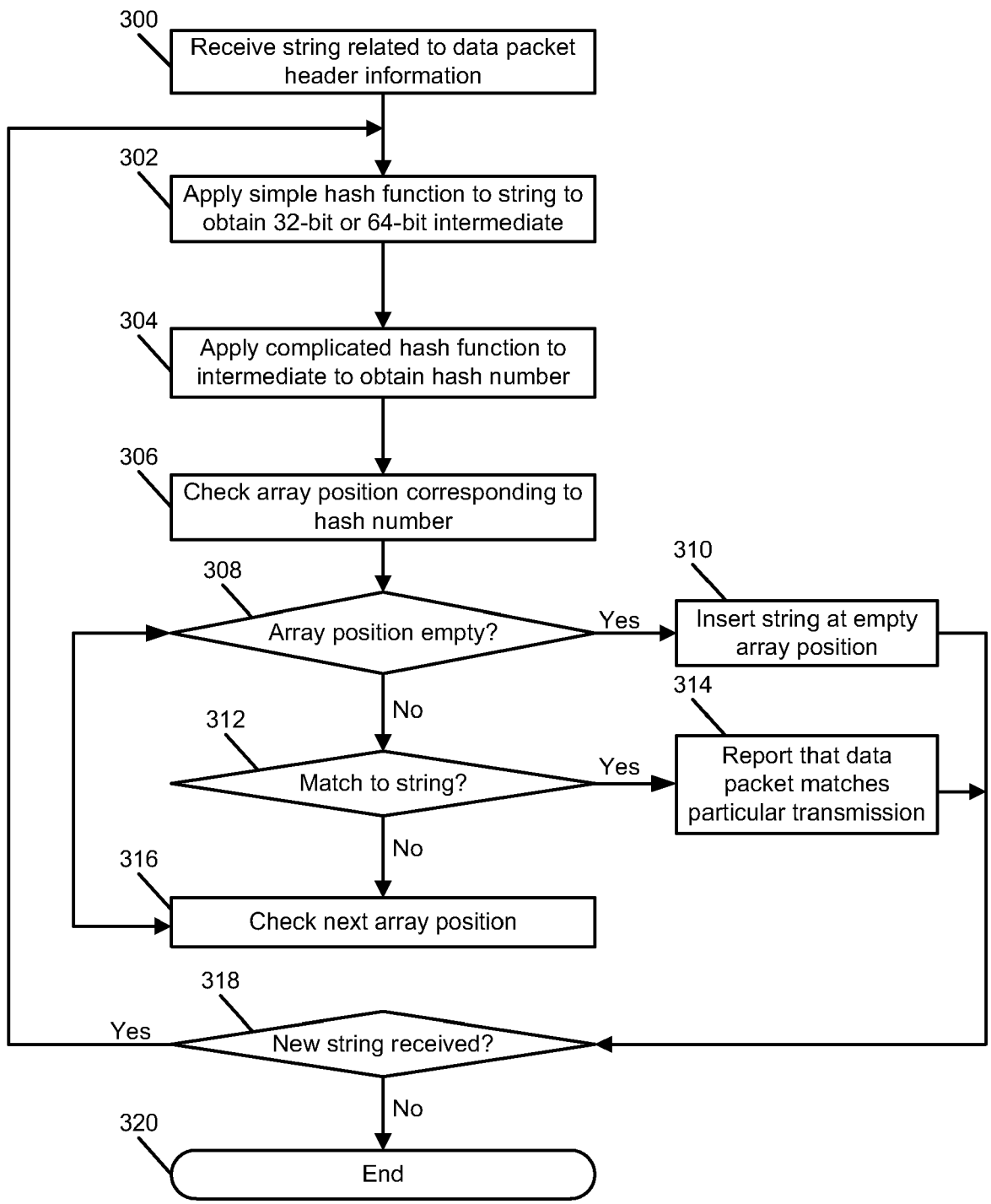
FIG. 3 is a flow diagram illustrating another particular embodiment of a method of analyzing data traffic.

FIG. 3 illustrates another particular embodiment of a method of analyzing data traffic. At block 300, a data analysis system receives a string related to header information associated with a particular data packet. Moving to block 302, the data analysis system applies a simple hash function, such as a universal hash function or a 2-universal hash function, to the string, thereby obtaining a 32-bit intermediate or a 64-bit intermediate, depending on a number of items that a hash table or other array is adapted to store. For example, if the array is adapted to store up to four million (4,000,000) strings, the intermediate can be a 32-bit intermediate; whereas, if the array is adapted to store more than four million strings, the intermediate can be a 64-bit intermediate. Proceeding to block 304, the data analysis system applies a complicated hash function, such as a 5-universal hash function, to the intermediate to obtain a hash number. Continuing to block 306, the data analysis system checks a position corresponding to the hash number in an array, such as a hash table, a database table or other array that stores strings related to data packets received at a server or other data packet transmission system.

Advancing to decision node 308, the data analysis system determines whether the array position is empty. If the array position is empty, the method moves to block 310, and the string is stored at the array position. Conversely, if the array position is not empty, the data analysis system determines whether a match to the string is stored at the array position. If a match is stored at the array position, the method moves to block 314, and the data analysis can report that a match has been found. For instance, the data analysis system can output data indicating that the particular data packet is associated with a particular transmission identified by the header information, such as an Internet session between a user computing device and a web server.

Returning to decision node 312, if the array position is not empty and does not include a matching string, the method proceeds to block 316, and the data analysis system checks a next array position, such as an array position corresponding to a next highest number or a next lowest number relative the hash number. The method then returns to decision node 308. Next array positions can be checked until an empty position or a matching string is found. The method can then proceed to decision node 318, and the data analysis system determines whether a new string has been received. If a new string has been received, the method returns to block 302. The method terminates at 320.

Figure 4:
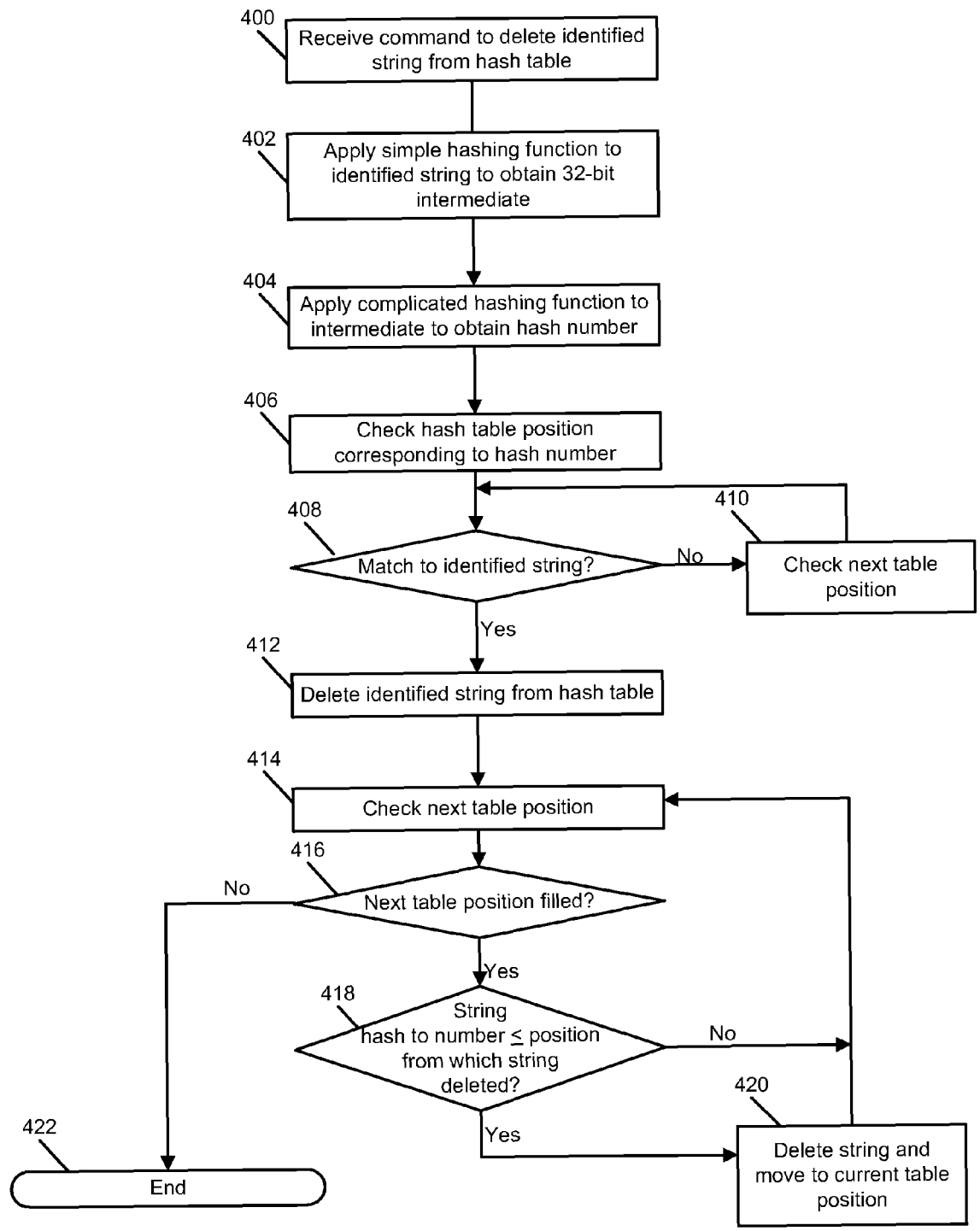
FIG. 4 is a flow diagram illustrating a further particular embodiment of a method of analyzing data traffic.

FIG. 4 illustrates a further particular embodiment of a method of analyzing data traffic. At block 400, a data analysis system receives a command to delete an identified string from a hash table. Moving to block 402, the data analysis system applies a simple hash function, such as a universal hash function or a 2-universal hash function, to the string, thereby obtaining a 32-bit intermediate. Proceeding to block 404, the data analysis system applies a complicated hash function to the intermediate to obtain a hash number. Continuing to block 406, the data analysis system checks a position in the hash table corresponding to the hash number.

Advancing to decision node 408, the data analysis system determines whether the string is stored at the hash table position corresponding to the hash number. If the string is not stored at the hash table position, the method moves to block 410, and the data analysis system checks a next hash table position and determines whether the string is stored at the next hash table position. After the data analysis system finds the string, the method moves to block 412, and the data analysis system deletes the string from the hash table.

Moving to block 414, the data analysis system checks a next hash table position relative to the hash table position from which the identified string was deleted. Proceeding to decision node 416, the data analysis system determines whether the next hash table position is filled. If the next hash table position is filled, the method continues to decision node 418, and the data analysis system determines whether another string stored at the next hash table position hashes to a number that is less than or equal to the hash number corresponding to the hash table position from which the string was deleted. If so, the method advances to block 420, and the data analysis system deletes the other string and stores the other string at the hash table position from which the identified string was deleted. The method can then return to block 414. The method terminates at 422.

In some embodiments, the methods disclosed herein maybe performed as described. In other embodiments, some aspects of each method may be performed in alternative sequences or simultaneously.

Figure 5:
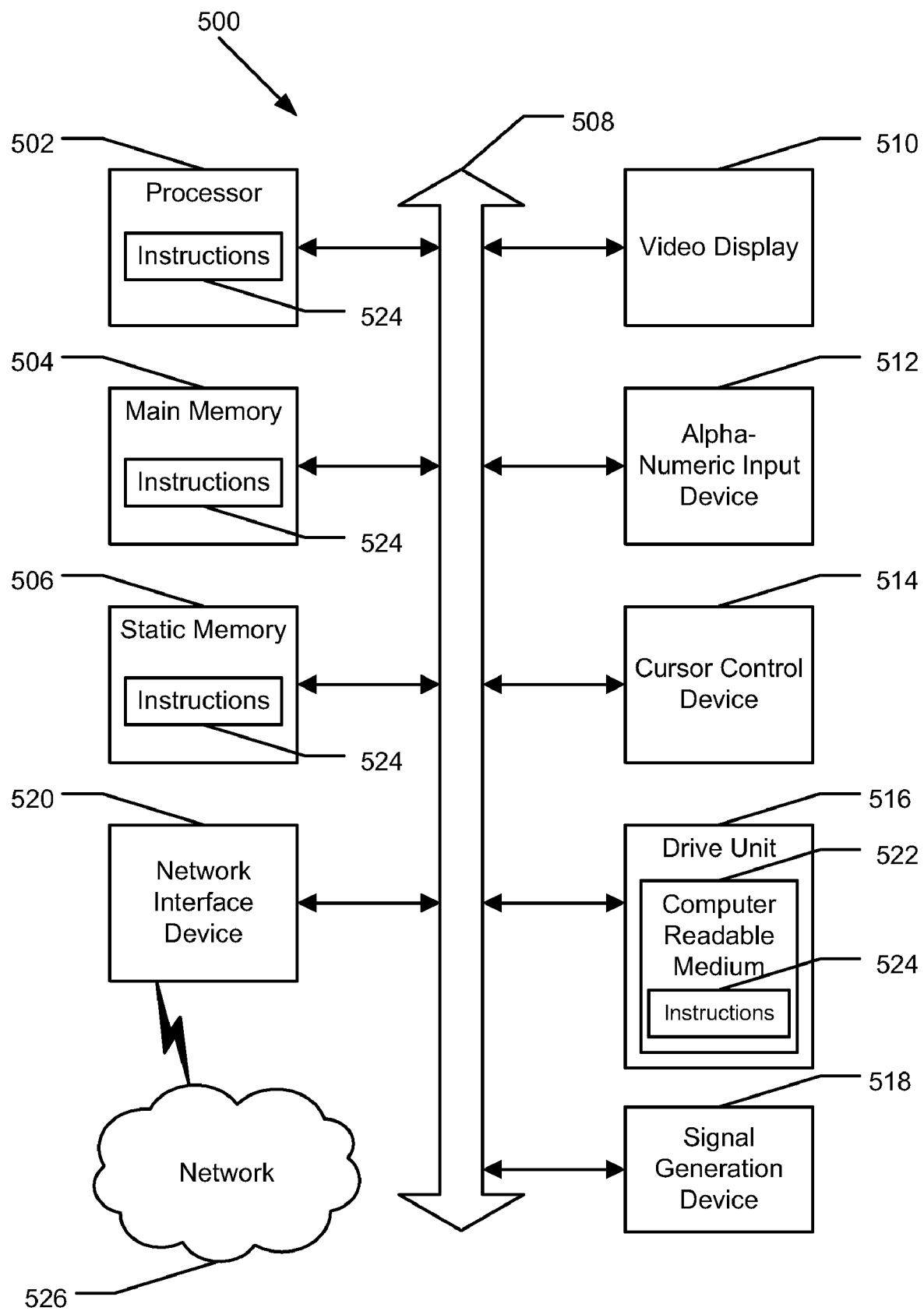
FIG. 5 is a block diagram illustrating a particular embodiment of a general computer system.

FIG. 5 is a block diagram illustrating a particular embodiment of a general computer system. The computer system 500 may operate as a standalone device or may be connected, e.g., using a network, to other computer systems or peripheral devices. In an illustrative embodiment, such standalone and peripheral devices can include, for example, servers, data analysis systems, user computing devices, user wireless devices, other network elements, or any combination thereof, as illustrated in FIG. 1.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein In accordance with the embodiments disclosed herein, systems and methods of analyzing data traffic are provided to perform processes with respect to variable length strings, such as inserting a string, finding a string, deleting a string, or any combination thereof, within an array, such as a hash table. Linear probing is a popular technique to store strings in a single array. With linear probing, a string is hashed to a location, and consecutive locations are "probed" until a match to the string, or an empty location, is found. Using 2-universal hashing to store strings leads to an expected number of probes that is a function of the number of strings stored in the hash table or other array. In contrast, using 5-universal hashing leads to a constant number of expected probes.

Unfortunately, 5-universal hashing cannot typically be used for complex domains, such as a variable length string. As a result, a collision-free hash function is often used to hash the string into an intermediate domain, and the 5-universal hash function can be used for the intermediate domain. It has been found, however, that for an expected constant number of linear probes, it suffices that each key has a constant number of expected collisions with a first hash function, as long as the second hash function is 5-universal. For instance, a 32-bit integer can be used as an intermediate domain, rather than the 64-bit integer intermediates produced by collision-free hashing of the string. As a result, the collision domain can be smaller, and such a smaller intermediate domain typically means that the overall hash function can be made simpler and at least twice as fast, particularly where a hash table stores more than 65,000 strings, such as from 65,000 strings to 4,000,000 strings.

Where the hash table or other array stores more than 4,000,000 strings, the method disclosed herein can be used to apply a simple hash function to a string to produce a 64-bit intermediate, in response to a command to find or store the string in the hash table, whereas previous methods using collision-free hashing produce a 128-bit intermediate for such large numbers of strings. The complicated hash function can then be applied to the 64-bit intermediate to obtain the hash number. In fact, the current method of applying a simple hash function to a string can produce an intermediate having a number of bits equal to $(\log\_2 * n)$, where n equals the number of items in the hash table or other array, rather than producing an intermediate having $2(\log\_2 * n)$ bits, as in previous methods using collision-free hashing.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of managing data, the method comprising:
   receiving a request at a data analysis system to store a string related to header information associated with a data packet;
   applying a simple hash function to the string, thereby obtaining a 32-bit intermediate;
   applying a complicated hash function to the 32-bit intermediate, thereby obtaining a hash number;
   storing the string in an array position corresponding to the hash number, when the array position is empty;
   determining whether a matching string is stored at the array position when the array position is not empty;
   incrementing a counter that indicates a number of data packets received for a particular data transmission when the matching string is stored at the array position;
   checking a next array position when the array position is not empty and the matching string is not stored at the array position;
   storing the string at the next array position, when the next array position is empty; and
   incrementing the counter that indicates a number of data packets received for a particular data transmission when the matching string is stored at the next array position.

2. The method of claim 1, wherein the header information includes a source address, a destination address, a protocol type, a sender identifier, a recipient identifier, a subject, a sending time stamp, a receiving time stamp, a mail transfer agent identifier, a syncword, or any combination thereof.

3. The method of claim 1, wherein the data packet is associated with Internet data traffic, e-mail data traffic, wireless device data traffic, or any combination thereof.

4. The method of claim 1, wherein the simple hash function comprises a universal hash function.

5. The method of claim 4, wherein the complicated hash function comprises a 5-universal hash function.

6. The method of claim 5, wherein the 5-universal hash function comprises a tabulated 5-universal hash function.

7. The method of claim 1, wherein the request is received from a network router.

8. The method of claim 1, wherein the array position is one of more than 65,000 positions in an array.

9. A method of managing data, the method comprising:
receiving a request at a data analysis system to find or store a string related to a data file; applying a simple hash function to the string, thereby obtaining a 32-bit intermediate;
applying a complicated hash function to the 32-bit intermediate, thereby obtaining a hash number;
storing the string in a hash table at a position corresponding to the hash number, when the position is empty;
determining whether a match to the string is stored at the position when the position is not empty;
outputting data stored with the data file when the match to the string is stored at the position;
checking a next position in the hash table when the position is not empty and the match to the string is not stored at the position;
storing the string at the next position, when the next position is empty; and
outputting data stored with the data file when the match to the string is stored at the next position.

10. The method of claim 9, wherein the next position succeeds the position in the hash table.

11. The method of claim 9, wherein the next position precedes the position in the hash table.

12. The method of claim 9, wherein the simple hash function is a 2-universal hash function.

13. The method of claim 12, wherein the complicated hash function is a 5-universal hash function.

14. The method of claim 9, wherein the string comprises a keyword, a portion of a file name, a date, a time, an author, a file type, a storage location, or any combination thereof.

15. The method of claim 9, wherein the hash table is adapted to store from sixty-five thousand strings to four million strings.

16. A non-transitory computer-readable medium including processor-readable instructions that are executable by a processor to perform a method, the method comprising:
applying a simple hash function to a string, thereby obtaining a 64-bit intermediate, in response to a command to find or store the string in a hash table that is adapted to store more than 4,000,000 strings;
applying a complicated hash function to the 64-bit intermediate, thereby obtaining a hash number;
storing the string in an array position corresponding to the hash number, when the array position is empty; and
performing a linear probing process to inspect a plurality of next array positions until a match to the string is found or an empty array position is found.

* * * * *